United States Patent [19]  [11] 4,279,880
Giet  [45] Jul. 21, 1981

[54] ACETYLENE BLACK WITH HIGH ELECTRICAL CONDUCTIVITY AND HIGH ABSORPTIVE POWER

[75] Inventor: Claude Giet, La Barthe de Neste, France

[73] Assignee: Produits Chimiques Ugine Kuhlmann, Courbevoie, France

[21] Appl. No.: 74,569

[22] Filed: Sep. 11, 1979

Related U.S. Application Data

[63] Continuation of Ser. No. 884,442, Mar. 7, 1978, abandoned.

[30] Foreign Application Priority Data

Mar. 9, 1977 [FR] France ................................ 77 06894

[51] Int. Cl.³ ...................... C01B 31/00; C01B 31/02; C09C 1/48
[52] U.S. Cl. ................................... 423/445; 423/450; 423/458; 106/307; 252/502
[58] Field of Search ............... 423/445, 449, 450, 451, 423/458; 106/307; 252/502

[56] References Cited

U.S. PATENT DOCUMENTS

| 3,124,529 | 3/1964 | Smit | 423/431 |
| 4,013,759 | 3/1977 | Giet | 423/450 |

FOREIGN PATENT DOCUMENTS

465176 6/1946 Belgium .
 77498 4/1936 Netherlands .
493929 1/1937 United Kingdom ..................... 423/450

OTHER PUBLICATIONS

Jones et al., Carbon Blacks Formed by Decomposition of Mixtures of Acetylene with a Hydrocarbon or other Gas at Elevated Pressure, 1950.

*Primary Examiner*—Helen M. McCarthy
*Assistant Examiner*—Gregory A. Heller
*Attorney, Agent, or Firm*—Beveridge, DeGrandi, Kline & Lunsford

[57] ABSTRACT

Carbon blacks having a carbon content greater than 99%, a mean particle diameter of 250 to 300 Å, an electrical resistivity, measured under a pressure of 6.3 bars, of 0.270 to 0.350 ohm.cm and a DBP index of 400 to 500 ml per 100 g of black are disclosed together with a process for their preparation by incomplete combustion of acetylene in air. These blacks may be used especially for the manufacture of electric cells.

9 Claims, 1 Drawing Figure

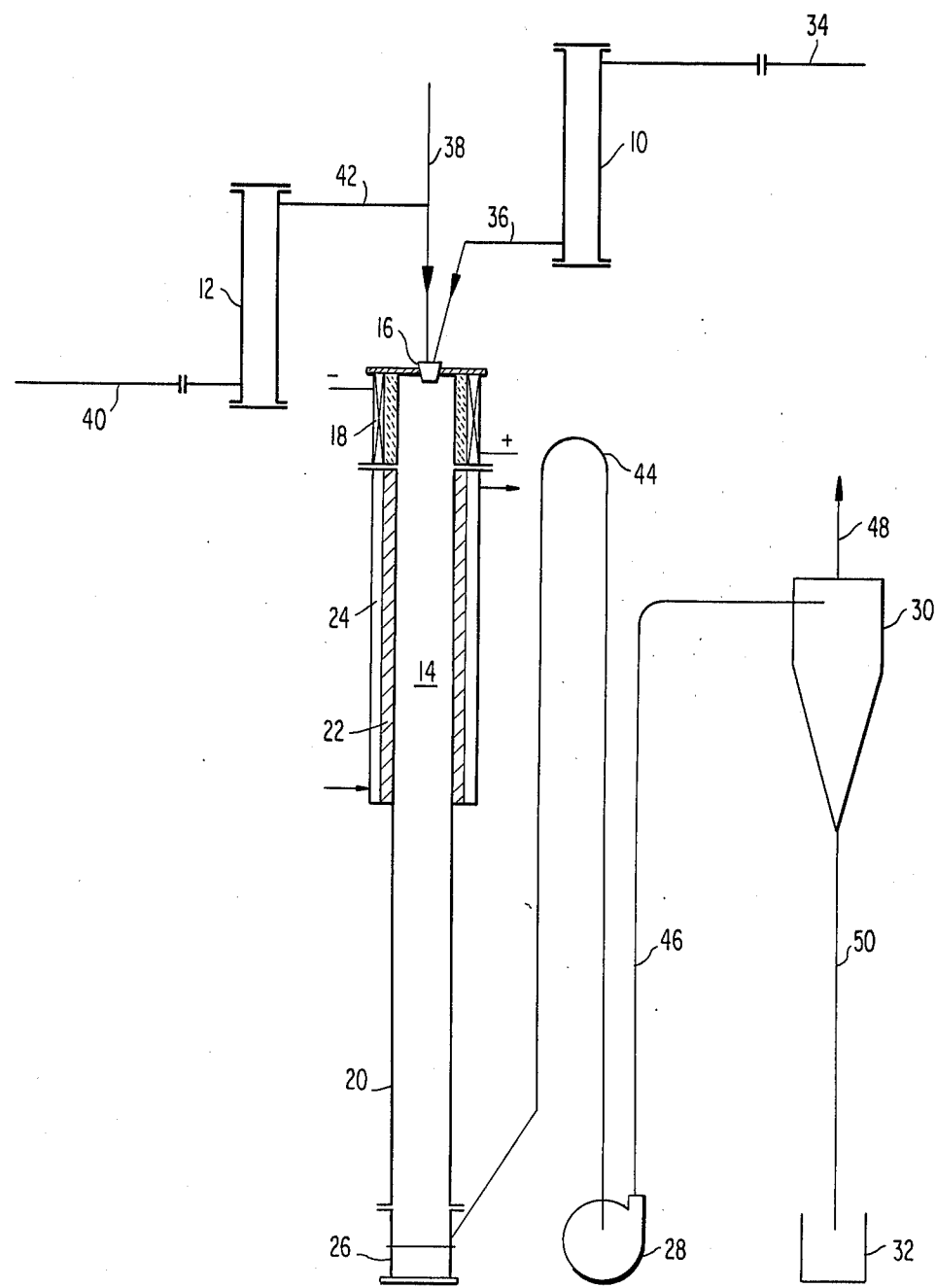

ACETYLENE BLACK WITH HIGH ELECTRICAL CONDUCTIVITY AND HIGH ABSORPTIVE POWER

This is a continuation of application Ser. No. 884,442, filed Mar. 7, 1978 now abandoned.

BACKGROUND OF THE INVENTION

1. Field of the Invention

The present invention relates to an acetylene black having both high electrical conductivity and high absorptive capacity for liquids. The invention also relates to a process for the preparation of this acetylene black.

2. Description of the Prior Art

The conductive carbon blacks may be classed in two large categories:

(1) The acetylene blacks, which are characterized by a very high purity (carbon content over 99%) and by being highly structured, and therefore have high absorptive power for liquids and excellent electrical conductivity; and (2) The furnace blacks, having undergone a thermal treatment, which are much less pure and less highly structured than the acetylene blacks, but which however do have good electrical conductivity.

The acetylene blacks are used primarily in the manufacture of electric cells. Their great absorptive power ensures retention of the electrolyte, and the black + electrolyte mixture simultaneously maintains a solid appearance and is thus capable of forming cylindrical blocks. The high purity and great electrical conductivity of the acetylene blacks enable them on the one hand to ensure the transport of current, and on the other hand, to exhibit a perfect chemical inertia towards the other constituents of the cell.

The thermally treated furnace blacks do not possess sufficient purity to be used in electric cells. They are used in the manufacture of conductive rubbers.

The acetylene black plays a dual role in the electric cell. On the one hand, due to its absorptive properties, it permits retention of the electrolyte, and on the other hand, due to its conducting properties, it gives the cell a weak internal resistance. In fact, when the black used is a black of high purity like an acetylene black, the amount of black necessary to ensure good electrical conductivity to the whole is much less than that necessary for the absorption of the electrolyte. There is thus seen the advantage to the user of possessing an acetylene black having the maximum absorptive power. The more highly absorptive the black is, the smaller will be the quantity of the black to be incorporated in the black + electrolyte mixture.

The acetylene blacks known up to now have an electrical resistivity, measured under a pressure of 6.3 bars, which is not less than 0.4 ohm.cm and an index of absorption of dibutyl phthalate (or DBP index) which does not exceed 320 ml. per 100 g of black. This DBP index, which is evaluated by the method of French standard NF T 45-122 modified as indicated hereinafter, is a measure of the absorptive power of the black for liquids.

These acetylene blacks are obtained either by thermal decomposition, at a temperature not more than 1800° C., of acetylene or a mixture of hydrocarbons containing acetylene (see French Pat. Nos. 941,596; 1,021,995; and 1,462,071; and U.S. Pat. No. 2,121,463), or by partial combustion, at a temperature above 1700° C., of a hydrocarbon other than acetylene (for example ethylene or benzene) by oxygen (see French Pat. No. 2,229,744). The decomposition temperature attained in the processes mentioned above, based on the thermal decomposition of acetylene or of mixtures containing acetylene, which temperature is also that of formation of the black and governs the structure and therefore the absorptive power of the black, is far removed from the theoretical temperature of formation of the black to which the equation (I) of thermal dissociation of acetylene leads:

$$C_2H_2 \rightarrow 2C + H_2 + 54.2 \text{ KCal} \qquad (I)$$

This theoretical temperature is in fact around 2500° C.

SUMMARY OF THE INVENTION

It has now been found, according to the present invention, that it is possible to obtain, by incomplete combustion of acetylene by air, acetylene blacks having an electrical conductivity and an absorptive power for liquids much superior to those of the acetylene blacks known in the prior art. Such an incomplete combustion reaction may be represented schematically by the following equation (II):

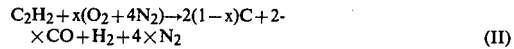

$$C_2H_2 + x(O_2 + 4N_2) \rightarrow 2(1-x)C + 2xCO + H_2 + 4xN_2 \qquad (II)$$

in which x is a number greater than 0 and less than 1.

The above result was achieved by carrying out the incomplete combustion in the following manner:

Acetylene, either preheated or not, is contacted in a combustion zone which may or may not be externally heated, e.g., a furnace, the walls of which may or may not be externally heated, with air preheated to a temperature above or equal to 600° C., the amounts of acetylene and air introduced being such that the molar ratio oxygen/acetylene [denoted by x in equation (II) above] is less than 1 and at least equal to 0.08, and preferably less than or equal to 0.20.

When the acetylene is preheated, the temperature thereof does not exceed 150° C. for reasons of security. As to the air, its preheating temperature does not exceed 850° C., for practical reasons.

Although in the process according to the invention, the combustion zone, e.g., the walls of the furnace, need not necessarily be heated externally, applicant has found that it is particularly advantageous to maintain the walls of the combustion zone, e.g., the walls of the furnace, in the zone where the acetylene black is formed, at a temperature above or equal to 1500° C. by an external supply of calories. In practice, the temperature at which the walls of the combustion zone or the walls of the furnace are therefore maintained does not exceed 2000° C.

BRIEF DESCRIPTION OF THE DRAWING

The drawing is a schematic representation of apparatus for carrying out the process of the present invention.

DESCRIPTION OF THE PREFERRED EMBODIMENTS

The apparatus in the drawing is shown by way of example and comprises essentially:

a preheater 10 for air and a preheater 12 for acetylene;

a vertical cylindrical furnace 14 having a total height of 7.4 m and an internal diameter of 300 mm, provided in its upper part with a burner 16 and comprising from top to bottom:

(a) over a height of 700 mm, an electrically fed resistor furnace 18;

(b) a metal tube 20 covered internally, in its upper part and over a height of 2.80 m, with a refractory material 22 (graphite), and possibly externally cooled, in this same part, by a circulation of water through cooler 24;

a disintegrator mill 26;
a ventilator 28;
a separation cyclone 30;
a hopper 32.

The burner 16 serves to introduce the acetylene and the air into the furnace. It is formed so that the current of air is introduced into the furnace in a zone immediately adjacent to the zone of introduction of the current of acetylene, at the periphery thereof and approximately tangentially thereto. Burner 16 comprises an axial nozzle, not shown, provided with a cylindrical internal channel for the introduction of acetylene which is surrounded by a hollow annular zone for introduction of the air. Such a burner has been described in more detail in French Pat. No. 2,229,744, equivalent to U.S. Pat. No. 4,013,759.

The function of mill 26 is to crush the agglomerates of black which may be formed. Ventilator 28 ensures a lowering of pressure within the furnace. This lowering of pressure, measured at the head of the furnace, is of the order of 200 mm of water.

In order to prepare an acetylene black according to the invention by means of the above apparatus, the operation is as follows. Air from a source not shown is passed through line 34 into preheater 10 wherein it is preheated to a temperature over or equal to 600° C., and then passed through line 36 into the furnace. Acetylene from a source not shown is passed through line 38 into the furnace. Alternatively, the acetylene may be passed through line 40 into preheater 12 wherein it is preheated to a temperature up to 150° C. and then passed through line 42 into line 38. The acetylene and the air are introduced into the furnace by means of the cylindrical internal channel and the hollow annular zone respectively of burner 16, the amounts of acetylene and air being calculated and regulated so that the molar ratio oxygen/acetylene has the desired value. The incomplete combustion of the acetylene is achieved in the upper part of the vertical furnace 14, the walls of which may or may not be electrically heated by means of the resistor furnace 18. The aerosol formed by the particles of carbon black and the residual gases of the reaction are sent through line 44 (in which the aerosol is cooled by natural convection), ventilating fan 28 and line 46 into the separation cyclone 30, from which the residual gases are exhausted through line 48 and the black is passed through line 50 and collected in hopper 32.

In continuous operation, the stream of acetylene is interrupted from time to time for a short period (a few seconds to a minute) and, during this interruption, a stream of compressed air is sent into the furnace so as to detach any carbon black which may have become fixed on the furnace walls.

Although it may not be possible to obtain, by the usual techniques of measurement of high temperatures, a valid indication as to the temperature actually attained during the incomplete combustion of acetylene by the process according to the invention, and therefore as to the temperature of formation of the black in this process, it is considered that this temperature is clearly greater than those attained in earlier processes involving the thermal decomposition of acetylene, and must be at least 2000° C. This opinion is in accord especially with the fact that the acetylene blacks according to the invention possess an exceptional crystalline arrangement and a particularly high structure as will be explained more fully below.

The characteristics of the acetylene blacks according to the invention were determined by the methods indicated hereinafter.

The mean diameter of particles and the surface area (or BET area) were determined respectively by electron microscope examination and by nitrogen adsorption.

The electric resistivity was determined as follows:

The black is placed in a non-conductive cylindrical tube having at its lower end a metal plug forming an electrode. Above the black is placed a metal piston, the end of which forms the other electrode. A weight sufficient to exert a pressure of 6.3 bars is applied to this piston. The amount of black introduced into the cylinder is sufficient to occupy a height of 1.5 cm under the pressure indicated above. The two electrodes are connected to a Wheatstone bridge and the electrical resistance R of the column of black is measured. The resistivity $\rho$ of the black, expressed in ohm.cm, is given by the formula:

$$\rho = R(S/l)$$

wherein R is expressed in ohms, S is the section of the column expressed in cm$^2$ and l is the height of the column expressed in cm.

The absorptive power for liquids, which in a way constitutes a measure of the structure of the black, may be characterized by various indices, especially the filter index and the DBP index.

The filter index is determined as follows:

The black is first passed through a screen the meshes of which are 0.074 mm. 5 g of the screened black are wetted with a water-acetone mixture containing 3% by weight of acetone so as to produce a slurry. The slurry is filtered on a Buchner funnel under a vacuum of 200 mm of water. The cake of black formed on the bottom of the Buchner after elimination of the greater part of the water is drained by leaving it for a further 20 minutes on the Buchner, while continuing to apply a vacuum of 200 mm of water. The weight of the water-acetone mixture absorbed by 5 g of black is then determined by weighing. This weight is called the filter index.

The DBP index is determined by the method of French standard NF T 45-122 modified as follows:

For each acetylene black, 7 measurements of the DBP index are made, corresponding respectively to 1, 2, 3, 4, 5, 6 and 7 g samples of the black, and a curve for the DBP index (expressed in ml per 100 g of black)=f (weight of the sample) is traced; this curve has a point of inflection; the value adopted for the DBP index is that corresponding to the point of inflection.

Table I below tabulates the characteristics of the acetylene blacks according to the invention. There are also given in this table, by way of comparison, the characteristics, measured by the same methods, of several known very conductive blacks: an acetylene black called Shawinigan black, a furnace black known under the trademark "Vulcan X C-72", and an acetylene black according to the French Pat. No. 2,229,744.

TABLE I

|  | Black According to the Invention | Shawinigan Black | Vulcan XC-72 | Black According to F.P. No. 2,229,744 |
|---|---|---|---|---|
| Carbon Content (%) | >99 | >99 | <99 | >99 |
| Mean Diameter of Particles (Å) | 250 to 300 | 300 to 400 | 200 | 150 to 200 |
| Surface Area (m²/g) | 100 to 120 | 70 | 245 | 85 to 115 |
| Resistivity (ohm.cm) | 0.270 to 0.350 | 0.595 | 0.470 | 0.400 to 0.700 |
| Filter Index | 100 to 120 | 60 to 65 | not determ. | 80 to 85 |
| DBP Index ml per 100 g of black | 400 to 500 | 310 | 175 | not determined |

The following Examples illustrate the invention without restricting it thereto. The apparatus used in these Examples is that previously described.

EXAMPLE 1

40 Nm³/h of acetylene, not preheated, and 40 Nm³/h of air preheated to 800° C. were introduced into the vertical furnace described above through the burner. The walls of the top part of the furnace were not electrically heated. Every 30 minutes the stream of acetylene was interrupted for 1 minute and a stream of air at ordinary temperature compressed to 2 bars is passed into the furnace. Then the stream of acetylene was started again. The reaction then restarted of itself. There was thus obtained 34 kg/h of an acetylene black having an electrical resistivity of 0.295 ohm.cm and a DBP index of 460 ml per 100 g of black.

The crystalline parameters (mean height $L_C$ of the crystalline piles, mean diameter $L_A$ of the layers, equidistance $C/2$ of two reticular planes) of the acetylene black obtained were determined by diffraction of X-rays. These parameters are collected in Table II below in which are also given, by way of comparison, the crystalline parameters of Shawnigan black and conductive furnace black known by the trademark "Vulcan SC".

TABLE II

|  | Black According to the invention | Shawinigan Black | Vulcan SC |
|---|---|---|---|
| $L_A$ in Å | 95 | 80 | 19 |
| $L_C$ in Å | 22 | 30 | 13 |
| $C/2$ in Å | 3.46 | 3.48 | 3.54 |

It will be noted that the crystalline structure of the black according to the invention is near to that of graphite (for graphite $C/2 = 3.41$ Å).

EXAMPLE 2

The operation was conducted as in Example 1 with the exception that 50 Nm³/h of acetylene preheated to 100° C. and 20 Nm³/h of air preheated to 700° C. were introduced into the furnace by way of the burner. There were obtained 49 kg/h of an acetylene black having a DBP index of 400 ml per 100 g of black and an electrical resistivity of 0.350 ohm.cm.

EXAMPLE 3

50 Nm³/h of acetylene (not preheated) and 20 Nm³/h of air preheated to 700° C. were introduced into the vertical furnace by way of the burner. The walls of the top part of the furnace were maintained by electrical heating at a temperature of about 1500° C. Every 30 minutes the stream of acetylene was interrupted for 10 seconds and air at ordinary temperature compressed to 2 bars was passed into the furnace. Then the current of acetylene was started again. There were obtained 49 kg/h of an acetylene black having a DBP index of 500 ml per 100 g of black and an electrical resistivity of 0.270 ohm.cm.

What is claimed is:

1. A carbon black having a carbon content greater than 99%, a mean particle diameter of 250 to 300 Å, an electrical resistivity, measured under a pressure of 6.3 bars, of 0.270 to 0.350 ohm.cm and a DBP index of 400 to 500 ml per 100 g of black.

2. A process for the preparation of a carbon black as defined in claim 1 which comprises effecting the incomplete combustion of acetylene with air by contacting in a furnace the acetylene with air preheated to a temperature at least equal to 600° C., the amounts of acetylene and air introduced being such that the molar ratio oxygen/acetylene is less than 1 and at least equal to 0.08.

3. The process according to claim 2 in which the molar ratio oxygen/acetylene is less than or equal to 0.20.

4. The process according to claim 2 in which the acetylene is preheated to a temperature which does not exceed 150° C.

5. The process according to claim 2 in which the walls of the furnace are heated by an external source of heat to a temperature at least equal to 1500° C.

6. A process for the preparation of a carbon black as defined in claim 1 which comprises effecting the incomplete combustion of acetylene with air by contacting in a combustion zone the acetylene with air preheated to a temperature at least equal to 600° C., the amounts of acetylene and air being such that the molar ratio oxygen/acetylene is less than 1 and at least equal to 0.08, and separating the carbon black from the resultant aerosol.

7. The process according to claim 6 in which the molar ratio oxygen/acetylene is less than or equal to 0.20.

8. The process according to claim 6 in which the acetylene is preheated to a temperature which does not exceed 150° C.

9. The process according to claim 6 in which walls of the combustion zone are heated by an external source of heat to a temperature at least equal to 1500° C.

* * * * *